United States Patent Office 2,859,456
Patented Nov. 11, 1958

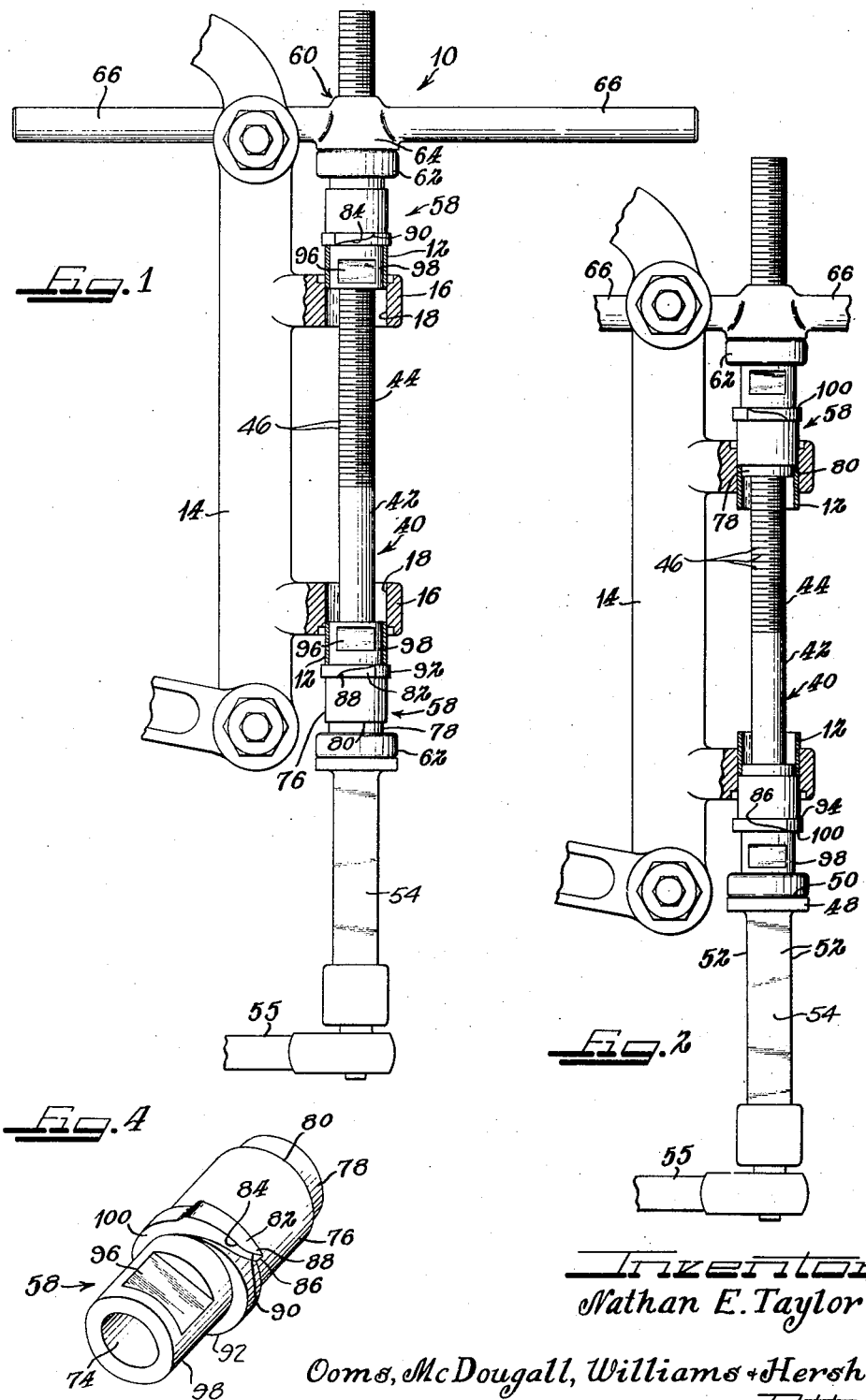

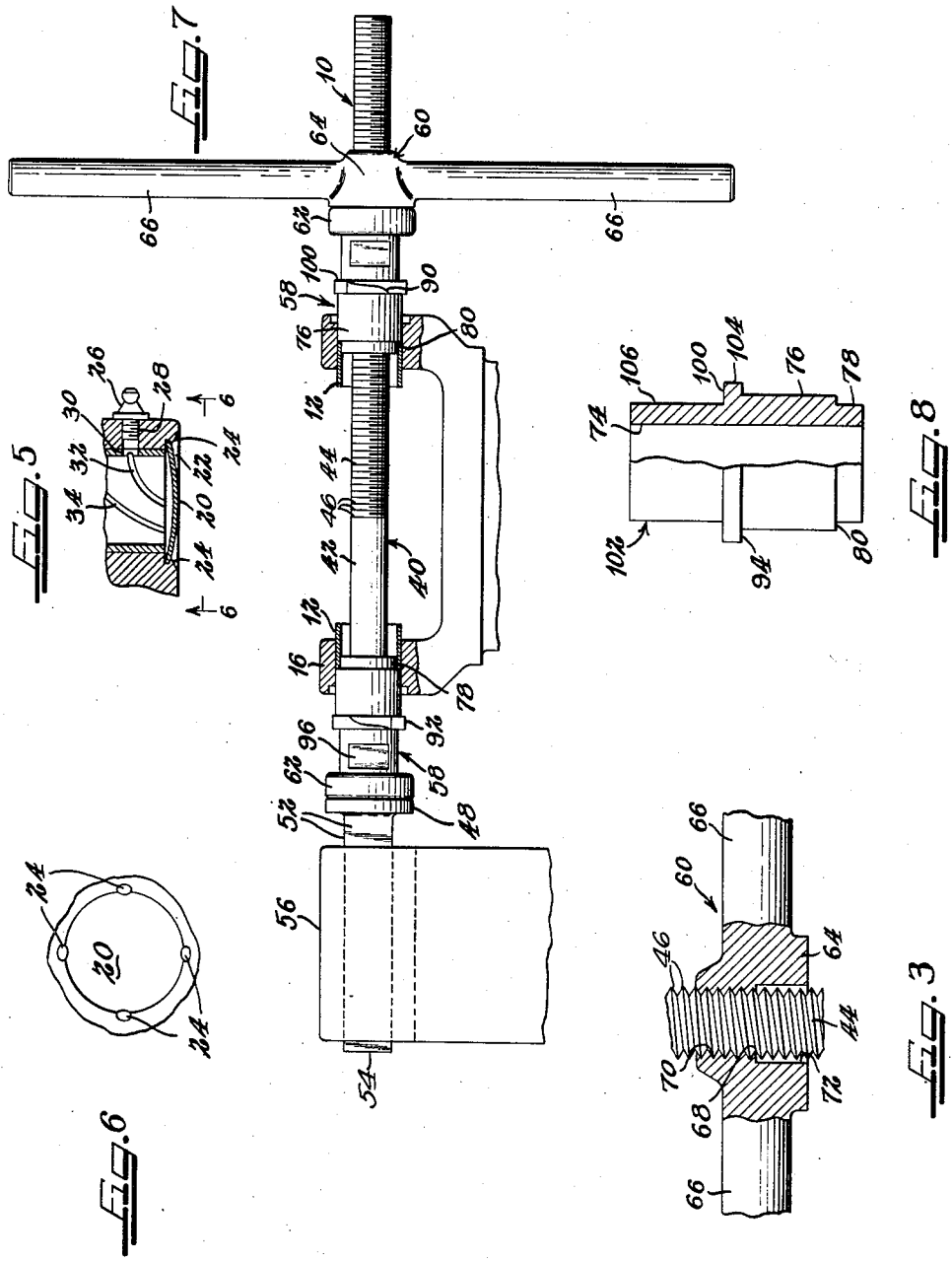

2,859,456

COMBINATION BUSHING REMOVER, SEAT REAMER, AND BUSHING SETTER

Nathan E. Taylor, Lufkin, Tex.

Application November 17, 1955, Serial No. 547,415

2 Claims. (Cl. 7—14.1)

This invention relates to a new and improved tool for removing and replacing bushings of the type employed in steering knuckles, steering knuckle supports, center steering brackets, and the like.

In such steering knuckles, supports and brackets, it is common practice to provide a pair of bushings which are disposed in alined bores formed in spaced lugs. The bushings are press-fitted into the bores and are adapted to receive a king pin or some other type of pivot pin. It will be understood that the king pin is adapted to support a cooperating part, such as a steering knuckle or arm, received between the lugs. It is the usual practice to provide a thrust bearing between one of the lugs and the cooperating part.

In one common type of steering knuckle or support, the bores for the bushings are formed with outer portions adapted to receive closure plugs in the form of domed expansion disks, commonly known as welch plugs. The expansion plugs may be seated against the ends of the bushings in the outer ends of the bores, or may be seated in enlarged counterbores formed in the ends of the bores. It is the usual practice to retain the expansion plugs by the localized swaging of inwardly projecting lips.

One principal object of the present invention is to provide a new and improved tool adapted to remove a bushing or bushings in a simple, quick and effective manner, without damaging the bushing or the member in which it is supported.

A further object is to provide a new and improved tool adapted to press a bushing or bushings into position in a precise yet simple manner, without damaging the bushing, so that any relatively untrained mechanic can readily set the bushing with the required degree of accuracy.

It is another object to provide a combination tool which is arranged in a new and improved manner so that it can be employed either to remove or to replace bushings.

A further object is to provide a new and improved combination tool adapted not only to remove bushings, but also to ream out the seats for the closure plugs, so as to remove the swaged metal and provide for precise seating of new expansion plugs.

It is another object to provide a tool of the foregoing character which is equipped with a new and improved actuating element in the form of an internally threaded T-handle having safety retainer means whereby the handle may be removed safely and expeditiously from the tool.

Further objects and advantages of the invention will appear from the following description, taken with the accompanying drawings, in which:

Figure 1 is an elevational view, partly in longitudinal section, of an illustrative embodiment of the invention in the form of a combination tool adapted to remove and replace bushings and ream out seats for expansion closure plugs, the view being arranged to show the manner in which bushings are inserted into a supporting member.

Fig. 2 is a view similar to Fig. 1, but showing the manner in which the tool is employed to remove bushings from their supporting member.

Fig. 3 is a fragmentary longitudinal sectional view taken through a T-handle employed to actuate the exemplary tool.

Fig. 4 is a perspective view of a seat-reaming and bushing-seating mandrel employed in the exemplary tool.

Fig. 5 is a fragmentary sectional view showing the manner in which the bushing and expansion plug are mounted in one type of steering knuckle or support with which the exemplary tool may be employed.

Fig. 6 is a fragmentary end view of the steering support taken as indicated by a line 6—6 in Fig. 5.

Fig. 7 is an elevational sectional view showing the tool with its arbor held in a vise for removing and resetting bushings in a steering knuckle or other member which may readily be removed from its position on a vehicle or the like.

Fig. 8 is an elevational view, partly in longitudinal section, of a modified mandrel for use with the exemplary tool.

If the drawings are considered in greater detail, it will be seen that they illustrate a tool 10 adapted to remove either or both of a pair of bushings 12 from a supporting member 14, which may be a steering knuckle, a steering knuckle support, or a center steering bracket, for example. The illustrated steering member 14 comprises a pair of vertically spaced lugs 16 formed with alined vertical bores 18 adapted to receive the bushings 12. The relation between the outside diameter of the bushings 12 and the inside diameter of the bore 18 may be such that the bushings must be press-fitted into the bores.

It will be understood that the bushings 12 are adapted to receive a king pin or other pivot pin (not shown) which, in turn, would support a steering knuckle or some other steering member having a sleeve portion disposed between the lugs 16. A thrust bearing would normally be interposed between the sleeve portion and one of the lugs.

Figs. 5 and 6 illustrate one common arrangement for closing the ends of the bores 18. It will be seen from Fig. 5 that an expansion plug 20 is mounted in the outer end of the bore 18. In this instance, a counterbore 22 is provided at the end of the bore to form a seat for the expansion plug 20. It will be understood, however, that in some instances the expansion plug may be seated directly in the bore, against the end of the bushing 16. In the construction illustrated by Fig. 5, the expansion plug 20 takes the form of a slightly domed, sheet metal disk which is inserted into the counterbore 22 with the convex side of the disk facing outwardly. The disk 20 is expanded by applying pressure against its center portion so as partially to flatten the disk and force its periphery against the counterbore. This type of expansion disk is commonly known as a welch plug.

In the illustrated case, the expansion plug 20 is retained in the counterbore 22 by means of a plurality of ears or lips 24, which project inwardly over the edge portion of the plug. The lips 24 may be formed by the localized swaging of metal from the supporting member 14. It will be understood that the swaged lips retain the plug 20 in its seat against the dislodging action of mechanical forces, such as vibration. Moreover, the lips prevent the expansion plug from being dislodged by lubricant pressure.

It will be seen that the illustrated steering support 14 is lubricated by means of an inlet fitting 26 adapted to be connected to a high pressure lubricant gun. The fitting 26 is threaded into a bore 28 formed in the steering member 14. As shown, the bore 28 communicates with a lateral opening 30 formed in the bushing 12. Lubricant is carried from the opening 30 to the space above the expansion plug by means of a spiral lubricant groove 32 formed along the inner surface of the bushing 12. A second, somewhat longer lubricant groove 34 carries lubricant upwardly in the bushing from the space above the expansion plug 20. The lubricant groove 34 extends along the full length of the bushing 12 and is adapted to carry lubricant to any thrust bearing which may be provided at the upper end of the bushing. Any substantial leakage of lubricant around the expansion plug 20 will prevent or diminish the flow of lubricant into and through the lubricant groove 34. The result may be insufficient lubrication of the bushing and the thrust bearing. Accordingly, it is important that the expansion plug 20 be perfectly seated and securely retained in the counterbore 22.

The illustrated tool 10 is adapted to remove the bushings 12 from the steering member 14. Such removal may become necessary due to wear on the bushings. It will be understood that the expansion plugs 20 must be removed before the bushings can be pressed out of their bores 18. Removal of the expansion plugs is readily effected by puncturing them and prying them out of the counterbores 22. In removing the bushings, the illustrated tool is operable to ream out the counterbores 22 so as to cut away the swaged ears 24. Thus, perfect seats are formed for new expansion plugs. The illustrated tool is also adapted to insert new bushings into the bores 18, without bending or otherwise damaging the bushings.

It will be seen that the illustrated tool includes an arbor 40 comprising a shaft 42 having a portion 44 formed with external threads 46. It will be understood that the threads 46 extend along at least a portion of the shaft 42 and may extend along the entire length of the shaft.

At one end of the shaft 42, the arbor 40 is preferably formed with an enlarged head or stop 48, which presents a shoulder 50 facing toward the shaft 42. It will be understood that various other means of defining the shoulder 50 might be provided. In this instance, the head 48 is equipped with wrench-receiving elements in the form of flat, longitudinally extending faces 52, four such faces being provided in the illustrated case. In other words, the head 48 is formed with a square shank portion 54 which defines the wrench-receiving faces 52. The shank 54 is adapted to receive a socket wrench 55 or any other suitable type of wrench, pliers or the like. It will be understood that the wrench-receiving shank 54 may also be held in a vise 56, as illustrated in Fig. 7. The vise 56 may be employed to good advantage when the steering member 14 is of a type which may readily be removed from its normal position on a vehicle. This is the case when the steering member takes the form of a steering knuckle, for example. For use with such a steering member, the square shank 54 of the arbor may be clamped in the vise 56 to immobilize the arbor.

The exemplary tool 10 is provided with a pair of mandrels 58 which are adapted to be slideably received on the shaft 42 of the arbor 40. A nut element or T-handle 60 is adapted to be threaded onto the shaft 42 so as to force the outer mandrel 58 toward the head 48. It will be understood that the tool may also be actuated by turning the arbor with a wrench, applied to the head, while the T-handle is blocked against rotation, as illustrated in Figs. 1 and 2. It is preferred to mount thrust bearings on the shaft 42 at the ends of the mandrels 58. One of the thrust bearings 62 is interposed between the head 48 and the lower mandrel 58, while the other thrust bearing is disposed between the upper mandrel and the T-handle 60. The thrust bearings may be of any suitable plain or anti-friction type, with or without ball or roller bearings. In some cases, the thrust bearings may assume the form of simple washers. One or both of the thrust bearings may often be dispensed with, particularly where the arbor is immobilized by being clamped in the vise 56.

The illustrated T-handle 60 comprises a hub or nut portion 64 fitted with a pair of oppositely extending radial arms 66. A bore 68 is formed in the hub portion 64 and is provided with a lower safety retainer portion 72 which is smooth surfaced and is enlarged so as to be slidably received over the threaded portion 44 of the shaft 42. When the T-handle 66 is to be mounted on the arbor 40, the smooth bore 72 may readily be fitted over the threaded shaft portion 44. The T-handle may then be rotated to start the internally threaded portion 70 onto the threaded shaft 42.

The T-handle may be removed most expeditiously from the arbor 40 by spinning the handle. In this way, the T-handle may be unscrewed very rapidly from the threaded shaft portion 44. Usually, the square shank portion 54 of the arbor 40 will be held in a vise while the T-handle is being removed. The T-handle may be removed most rapidly when the arbor 40 is clamped in a horizontal position in the vise. Spinning the T-handle will rapidly unscrew the internally threaded bore 70 from the threaded shaft portion 44. After the threads in the handle have been disengaged from the threads on the arbor, the handle will be safely retained on the end of the arbor by the smooth retaining bore 72. As the handle is spun toward the end of the arbor, a finger may be pressed against the end of the arbor to catch the handle. In the final stages of the spinning operation, the handle will engage the finger and push it away from the end of the arbor. When the threads in the handle have been disengaged from those on the arbor, the finger may be used as a brake to stop the spinning rotation of the handle. Meanwhile, the smooth safety retainer bore 72 prevents the handle from flying off the end of the arbor.

It will be seen that each of the illustrated mandrels 58 is formed with an axial bore 74 adapted to be slidably received over the shaft portion 42 of the arbor 40. To provide for removal of the bushings 12, each mandrel 58 is formed with a first cylindrical portion 76 of an outside diameter corresponding generally to the outside diameter of the bushings. The outside diameter of the cylindrical portion 76 is preferably made slightly less than that of the bushings so that the cylindrical portion 76 may readily be received within the bores 18 in the steering member 14. In other words, the size of the cylindrical portion 76 is such as to provide a free sliding fit with the bores 18.

To center the cylindrical portion 76 relative to the associated bushing 12, each mandrel 58 is formed with a reduced pilot end portion 78 corresponding generally in outside diameter to the inside diameter of the bushings. Actually, the end portion 78 is preferably made slightly smaller in diameter than the inside diameter of the bushings so that the end portion may readily be inserted into the associated bushing. An annular, radially extending shoulder 80 is formed between the reduced end portion 78 and the cylindrical portion 76.

In removing the bushings 12, the mandrels 58 are strung on the arbor shaft 42 with the reduced pilot portions 78 pointing toward each other. The steering member 14, with its bushing 12, is interposed between the mandrels. It will be seen from Fig. 2 that the reduced end portions 78 are inserted into the bushings 12. The annular shoulders 80 are brought against the ends of the bushings 12, and then force is applied between the mandrels 58 by screwing down the T-handle 60 or rotating the arbor. In this way, the bushings 12 are pressed toward each other and out of the bores 18.

The mandrels 58, as illustrated in Figs. 1, 2 and 4, are arranged to ream out the ends of the bores 18 in the supporting member 14 so as to form renewed seats for new expansion plugs. The reaming of the bores is accomplished immediately after the bushings have been pushed out of the supporting member 14. To provide for such reaming action, each of the mandrels 58 is formed with cutting means, disposed adjacent the cylindrical portion 76, at the opposite end thereof with respect to the reduced end portion 78. In each of the illustrated mandrels 58, the cutting means take the form of a peripheral blade 82 having a cutting edge 84 which is generally spiral or helical in shape. The blade 82 tapers to a point 86 at one end of the cutting edge 84. Adjacent the point 86, the blade 82 has a portion 88 which tapers more sharply than the remainder of the blade. Likewise, the cutting edge 84 has a portion 90, extending along the point portion 88 of the blade 82, which spirals at a sharper angle than the remainder of the cutting edge. This shortening of the point portion 88 of the blade has the effect of strengthening the blade and virtually eliminating breakage of the point 86. The sharply tapered cutting edge 90 has a progressive shearing action on the swaged lips 24. When each of the lips 24 is first encountered by the blade 82, only a small amount of metal is removed initially. As the cut progresses, the area of engagement between the blade and the lip is increased. For this reason, localized stresses on the blade are minimized and breakage of the point is virtually eliminated. The chip or shaving removed by the blade is readily expelled along the spiral cutting edge 84.

In each of the mandrels 58, as illustrated, the cutting blade 82 is formed on an enlarged annular rib 92 located adjacent the cylindrical portion 76. A shoulder 94 is formed between the cylindrical portion 76 and the rib 92. In this instance, the enlarged portion 92 is adapted to be received in the counterbored seat 22 at the outer end of each bore 18. The shoulder 94 engages the bottom of the counterbore and thereby limits movement of the mandrel 58 into the bore 18. With the shoulder 94 engaging the bottom of the counterbore, the mandrel is rotated so that the cutting element 82 will ream out the counterbore and thereby remove the swaged lips 24.

It will be seen that the enlarged portion 92 corresponds generally in outside diameter to the inside diameter of the counterbore, but actually is sufficiently smaller in diameter than the counterbore to be received within the lips 24. The cutting blade 82 projects to a greater radius corresponding to the internal radius of the counterbore 22. It will be understood that the radii of the portion 92 and the cutting blade 82 may be varied to correspond with various sizes of closure seats in different steering knuckles, supports or the like. It will also be realized that the shape and character of the cutting element may be varied considerably. For example, several cutting blades or teeth may be employed at spaced intervals. In character, the teeth may be chisel-shaped, or similar to those of a file. The size and number of the blades or teeth may be varied to suit the kind of metal to be cut away and the shape of the swaged metal elements to be removed.

To provide for rotation of the mandrels 58, each mandrel is formed with wrench-receiving means. In the illustrated embodiment, the wrench-receiving means take the form of a pair of diametrically opposite flat faces 96 formed on the mandrel. It will be understood that any other type of wrench-receiving elements may be employed. The wrench-receiving elements 96 are formed on a portion of the mandrel which projects outwardly from the bore 18 after the bushing has been pushed out of the bore and the cutting element 82 has been seated in the counterbored seat 22. Thus, a wrench may be engaged with the flats 96 and employed to rotate the mandrel so as to bring the cutting point 86 against the successive ears 24. As already indicated, the blade 82 shears away the ears and ejects the resulting shavings from the counterbore 22. Accordingly, the counterbore is reamed out so that it will be smooth and truly cylindrical.

The illustrated mandrels 58 are arranged to facilitate the insertion of new bushings 12 into the bores 18 in the supporting member 14. For this purpose, each of the mandrels is provided with a second, reduced pilot end portion 98 of generally cylindrical form. It will be seen that the wrench flats 96 are formed in the second pilot portion 98. A shoulder 100 is formed between the reduced portion 98 and the enlarged portion 92 for engagement with the ends of the bushings 12. In outside diameter and length, the reduced portion 98 corresponds generally to the inside diameter and length of the bushings 12. In the illustrated embodiment, the reduced portion 98 is considerably longer than the reduced portion 78 at the opposite end of the mandrel 58.

When the bushings are to be inserted into the bores 18 in the supporting member 14, each of the mandrels is reversed in position on the arbor 40 so that the mandrels will be disposed as illustrated in Fig. 1. When the mandrels are thus positioned, the reduced portions 98 will point toward each other. In assembling the tool, the bushings 12 are slipped over the reduced portions 98, and the shaft 42 is inserted through the bores 18 in the supporting member 14. The bushings 12 are started in the bores 18, and then the T-handle 60 is screwed down. This forces the mandrels toward each other and presses the bushings into the bores 18. The reduced pilot portions 98 guide the bushings in such a manner as to maintain them in alined relation with respect to each other and with respect to the bores 18. Moreover, the pilot portions 98 maintain the cylindrical shape of the bushings and thus prevent the bushings from being bent or warped by the forces to which they are subjected while being pressed into the bores 18.

As the bushings are moved into their full inserted positions, the shoulders 100 on the mandrels engage the bottoms of the counterbores 22 and thereby limit inserting movement of the mandrels. Thus, the enlarged annular rib 92 serves to limit movement of the mandrels during both the insertion and the expulsion of the bushings. By using the illustrated tool, it is a simple and quick matter to install the bushings with the required degree of precision, with respect to alinement of the bushings and maintenance of dimensional integrity.

Fig. 8 illustrates a modified type of mandrel 102 which may be substituted for the mandrels 58, in some cases. The mandrel 102 is essentially the same as the mandrel 58 except that the cutting element 82 and the wrench flats 96 are omitted from the mandrel 102. Accordingly, the same reference characters have been employed in Fig. 8 as in Figs. 1, 2 and 4, to indicate the various elements of the mandrel 102, except that the enlarged annular rib and the reduced pilot portion, designated 92 and 98 in Figs. 1, 2 and 4, have been designated 104 and 106 in Fig. 8. Both of these elements are cylindrical in form as embodied in the modified mandrel 102. During expulsion of the bushing from its supporting member, the enlarged rib 104 limits movement of the mandrel. During insertion of a new bushing, the cylindrical pilot portion 106 is received as a guide within the bushing. The end of the bushing engages the shoulder 100 on the rib 104. When the bushing has been fully seated in the bore 18, the rib 104 engages the steering knuckle or support and acts as a stop to prevent further movement of the mandrel.

Modified mandrels of the type illustrated in Fig. 8 may be employed advantageously in removing and replacing bushings in steering knuckles or supports utilizing closures which are retained in place on the steering members by means other than swaged lips or the like. For example, some types of steering knuckles or supports employ closure plates which are held in place by mounting screws threaded into the steering member. Gaskets are often interposed between the plates and the steering member to prevent leakage of lubricant. With such types of closures, there is no need to ream out the ends of the bores in the steering members. Accordingly, the reaming elements may be omitted, as illustrated in Fig. 8. Since it is not necessary to rotate the mandrels, the wrench flats may also be omitted.

With a tool arranged in accordance with the present invention, it is a simple matter to remove and replace bushings in a safe, expeditious and precise manner. Immediately after the bushings have been removed, the seats for the expansion closure plugs may be reamed out simply by leaving the tool in place and rotating the mandrels with a wrench. After the tool has been removed and the mandrels have been reversed in position, the tool may be employed to insert new bushings. The tool operates in such a manner as to insure precise alinement of the seated bushings. Moreover, there is virtually no possibility of bending or otherwise damaging the bushings.

The smooth safety retainer bore 72 in the T-handle retains the T-handle on the end of the threaded shaft as the T-handle is being removed from the shaft. Thus, the T-handle may be spun rapidly as it is removed from the shaft, without danger that the handle will fly off the end of the shaft. The smooth safety bore 72 retains the handle on the shaft after the threads on the handle have been disengaged from those on the shaft.

Various other modifications, alternative constructions and equivalents may be employed without departing from the true spirit and scope of the invention as exemplified in the foregoing description and defined in the following claims.

I claim:

1. In a tool for removing and replacing a pair of bushings from alined bores in a supporting member, the combination comprising a screw-threaded arbor having enlarged stop means at one end thereof, a pair of mandrels slidably received on said arbor, nut means disengageably threaded onto said arbor, said nut means having operating means thereon, each of said mandrels having a pilot end portion at one end thereof and corresponding in outer diameter with the inner diameter of the bushings for reception therein, each of said mandrels having a generally cylindrical portion adjacent said pilot portion with a shoulder therebetween engageable with the outer end of one of the bushings for pushing the bushings toward each other and out of the alined bores, said cylindrical portion corresponding generally in outer diameter and length to the outer diameter and length of the bushings, each of said mandrels having cutting means thereon adjacent said cylindrical portion for reaming out the ends of the bores in the supporting member, and means on each of said mandrels for rotating the same and thereby actuating said cutting means.

2. A mandrel for use with a tool for removing and replacing a bushing in a bore in a supporting member, said mandrel comprising a body having an axial bore therethrough, a first pilot end portion of generally cylindrical form at one end of said body and corresponding generally in outer diameter to the inner diameter of the bushing for reception therein, a generally cylindrical second portion on said body adjacent said first pilot portion with a shoulder therebetween engageable with the end of the bushing for pushing the bushing out of the bore in the supporting member, said second portion corresponding generally in outer diameter and length to the outer diameter and length of the bushing, cutting means on said body adjacent said second portion for reaming out the end of the bore in the supporting member, and wrench-receiving means on said body for rotating said body and thereby actuating said cutting means.

References Cited in the file of this patent

UNITED STATES PATENTS 2,596,549    Hamilton _____ May 13, 1952